(12) United States Patent
Wei et al.

(10) Patent No.: US 12,520,175 B2
(45) Date of Patent: Jan. 6, 2026

(54) DEVICE, SYSTEM, AND METHOD FOR WIRELESS LOCAL AREA NETWORK (WLAN) SENSING

(71) Applicant: NXP USA, Inc.

(72) Inventors: Dong Wei, Austin, TX (US); Rui Cao, Sunnyvale, CA (US); Hongyuan Zhang, Fremont, CA (US); Christian Raimund Berger, San Jose, CA (US); Liwen Chu, San Ramon, CA (US)

(73) Assignee: NXP USA, Inc., Austin, TX (US)

( * ) Notice: Subject to any disclaimer, the term of this patent is extended or adjusted under 35 U.S.C. 154(b) by 592 days.

(21) Appl. No.: 17/894,998

(22) Filed: Aug. 24, 2022

(65) Prior Publication Data

US 2023/0060492 A1 Mar. 2, 2023

Related U.S. Application Data

(60) Provisional application No. 63/237,123, filed on Aug. 25, 2021, provisional application No. 63/266,554, filed on Jan. 7, 2022.

(51) Int. Cl.
| | |
|---|---|
| *H04W 84/12* | (2009.01) |
| *H04W 24/08* | (2009.01) |
| *H04W 52/14* | (2009.01) |
| *H04W 52/54* | (2009.01) |

(52) U.S. Cl.
CPC ......... *H04W 24/08* (2013.01); *H04W 52/146* (2013.01); *H04W 52/54* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2021/0288779 A1* | 9/2021 | Da Silva | H04W 72/0473 |
| 2022/0312213 A1* | 9/2022 | Trainin | H04W 12/106 |
| 2022/0345187 A1* | 10/2022 | Merlin | H04B 7/0658 |

OTHER PUBLICATIONS

Au, O. et al. "802.11 Sensing: Applications, Feasibility, Standardization", document IEEE 802.11-19/1626, Sep. 17, 2019, 15 pgs.
Dash, D. et al., "CSI-based Wi-Fi Sensing: Results and Standardization Challenges", document IEEE 802.11-19/1769, Oct. 30, 2019, 10 pgs.
Au, O. et al. "Wireless Sensing: Use Cases, Feasibility and Standardization," document IEEE 802.11-19/1745. Oct. 9, 2019, 16 pgs.

(Continued)

*Primary Examiner* — Benjamin Lamont

(57) ABSTRACT

Embodiments of a device, a method, and a system for wireless local area network (WLAN) sensing are disclosed. In an embodiment, the device for WLAN sensing includes a wireless network interface device implemented on one or more integrated circuits (ICs), where the wireless network interface device is configured to receive a sounding Physical Layer (PHY) Protocol Data Unit (PPDU) that includes preamble training fields, and detect environmental changes using managed sensing measurements obtained from the preamble training fields included in the sounding PPDU.

17 Claims, 12 Drawing Sheets

(56) References Cited

OTHER PUBLICATIONS

Allegue, M. et al., "Wi-Fi Sensing: Technical Feasibility, Standardization Gaps," document IEEE 802.11-19/1803r0, Oct. 30, 2019, 19 pgs.
Da Silva, C. et al., "Discussion of Sensing Measurement Result Types," document IEEE 802.11-21/0357, Mar. 5, 2020, 11 pgs.
IEEE, "Part 11: Wireless LAN Medium Access Control (MAC) and Physical Layer (PHY) Specifications Amendment 1: Enhancements for High-Efficiency WLAN", IEEE Std 802.11ax™, Feb. 9, 2021, 767 pgs.
IEEE, "P802.11az™/D5.0 Draft Standard for Information technology—Telecommunications and information exchange between systems Local and metropolitan area 10 networks—Specific requirements", May 2022, 287 pgs.
IEEE, "P802.11az™/D5.0 Draft Standard for Information technology—Telecommunications and information exchange between systems Local and metropolitan area 10 networks—Specific requirements", May 2022, pp. 164-171.
IEEE, "P802.11az™/D5.1 6 Draft Standard for Information technology—Telecommunications and information exchange between systems Local and metropolitan area networks—Specific requirements", Aug. 2022, 294 pgs.

\* cited by examiner

| UL TARGET RECEIVE POWER SUBFIELD | DESCRIPTION |
|---|---|
| 0 – 90 | THE EXPECTED RECEIVE SIGNAL POWER, IN UNITS OF dBm, IS Targetpwr = −110 + Fval, WHERE Fval IS THE SUBFIELD VALUE |
| 91 – 126 | RESERVED |
| 127 | THE STA TRANSMITS THE HE TB PPDU AT THE STA'S MAXIMUM TRANSMIT POWER FOR THE ASSIGNED HE-MCS. IF THE TRIGGER FRAME IS A SOUNDING OR PASSIVE SOUNDING RANGING TRIGGER FRAME THAT DO NOT ASSIGN AN HE-MCS, THE ASSIGNED HE-MCS IS ASSUMED TO BE HE-MCS 0 IN TERMS OF SETTING THE STA'S TRANSMIT POWER. IF THE TRIGGER FRAME IS A SECURED SOUNDING RANGING TRIGGER FRAME THAT DOES NOT ASSIGN AN HE-MCS, THE ASSIGNED HE-MCS IS ASSUMED TO BE HE-MCS 6 IN TERMS OF SETTING THE STA'S TRANSMIT POWER NOTE – THE EXPECTED RECEIVE SIGNAL POWER IS THEN THE STA'S MAXIMUM TRANSMIT POWER FOR THE ASSIGNED HE-MCS MINUS THE PATH LOSS. |

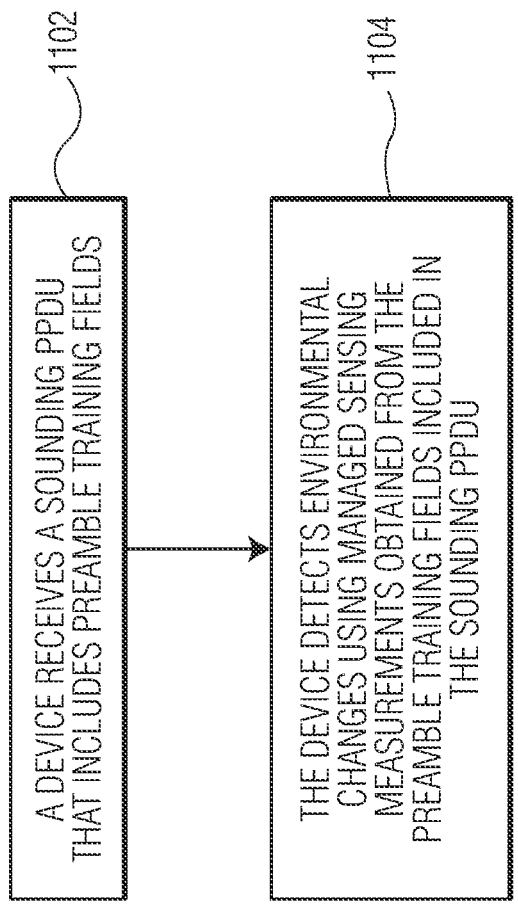

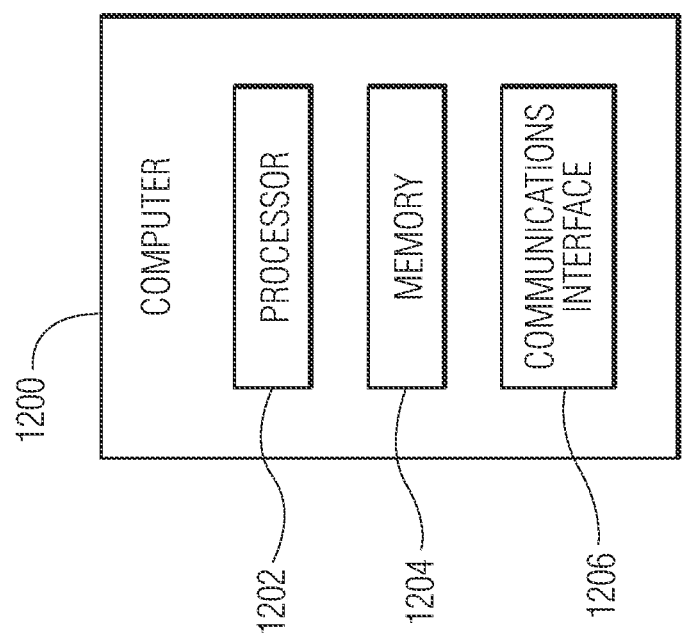

DEVICE, SYSTEM, AND METHOD FOR WIRELESS LOCAL AREA NETWORK (WLAN) SENSING

CROSS-REFERENCE TO RELATED APPLICATIONS

This application is entitled to the benefit of U.S. Provisional Patent Application Ser. No. 63/237,123, filed on Aug. 25, 2021, and U.S. Provisional Patent Application Ser. No. 63/266,554, filed on Jan. 7, 2022, each of which is incorporated by reference herein.

BACKGROUND

In wireless local area network (WLAN) sensing systems, sensing devices, e.g., sensing initiators and sensing responders, can exchange sensing information and execute various operations in response to the sensing information. As an example, sensing measurements may be exchanged by a sensing initiator and/or a sensing responder to detect environmental changes. However, when a systematic change occurs in a WLAN sensing system, the reliability of the sensing measurements can be negatively impacted. Consequently, sensing measurement patterns used in WLAN sensing may become more complicated, and it may be difficult for sensing devices to differentiate environmental changes from systematic changes.

SUMMARY

Embodiments of a device, a method, and a system for wireless local area network (WLAN) sensing are disclosed. In an embodiment, the device for WLAN sensing includes a wireless network interface device implemented on one or more integrated circuits (ICs), where the wireless network interface device is configured to receive a sounding Physical Layer (PHY) Protocol Data Unit (PPDU) that includes preamble training fields, and detect environmental changes using managed sensing measurements obtained from the preamble training fields included in the sounding PPDU.

In an embodiment, the managed sensing measurements are channel state information (CSI) measurements, and where the CSI measurements are associated with a parameter that is managed and monitored by at least one of a sensing initiator and a sensing responder.

In an embodiment, the parameter is at least one of a transmit power parameter and a beamforming steering matrix.

In an embodiment, the managed sensing measurements are CSI measurements, and the CSI measurements are associated with a parameter that is made constant by at least one of a sensing initiator and a sensing responder.

In an embodiment, the managed sensing measurements are CSI measurements, the CSI measurements are associated with a parameter that cannot be made constant by a sensing transmitter, and the sensing transmitter indicates its transmit power to a sensing receiver.

In an embodiment, the device transmits at least one of a Null Data Packet Announcement (NDPA) frame and a Sensing Measurement Report (SMR) frame in a non-Trigger Based (non-TB) sensing measurement exchange, and where at least one of the NDPA frame and the SMR frame indicates at least one of to keep a transmit power constant and a transmit power of a Null Data PPDU (NDP).

In an embodiment, at least one of the NDPA frame and the SMR frame indicates to keep the transmit power constant via an added field bit, a reserved value included in an NDP Target Received Signal Strength Indicator (RSSI) subfield, and a bit included in the NDP Target RSSI subfield.

In an embodiment, at least one of the NDPA frame and the SMR frame indicates to keep the transmit power constant via a reserved value of "0xff" included in an NDP Target RSSI subfield.

In an embodiment, at least one of the NDPA frame and the SMR frame indicates to keep the transmit power constant via at least one of a Most Significant Bit (MSB) and a Least Significant Bit (LSB) included in an NDP Target RSSI subfield.

In an embodiment, the device transmits an NDPA frame in a Trigger-Based (TB) sensing measurement exchange, and where the NDPA frame indicates to keep a transmit power of a down-link (DL) NDP frame constant.

In an embodiment, a modified Trigger Frame (TF) Sound frame indicates to keep a transmit power of an up-link (UL) NDP frame constant, and an SMR frame indicates the transmit power of the UL NDP frame.

In an embodiment, the modified TF Sound frame uses at least one of a redefined UL Target Receive Power subfield and a reserved bit included in a User Info field to indicate to keep the transmit power of the UL NDP frame constant.

In an embodiment, the device transmits an NDPA frame in a TB sensing measurement exchange, and where the NDPA frame indicates a transmit power of a DL NDP frame.

In an embodiment, the NDPA frame indicates the transmit power of the DL NDP frame via a Station (STA) Info field with an Association Identifier (AID) of 2045.

In an embodiment, the environmental changes are detected by using the managed sensing measurements to differentiate the environmental changes from system configuration changes.

In an embodiment, the managed sensing measurements are at least one of CSI measurements, power delay profiles, directional multi-gigabit (DMG) beamforming training measurements, and enhanced DMG (EDMG) beamforming training measurements.

A method for WLAN sensing is also disclosed. In an embodiment, the method includes receiving, by a sensing transmitter from a sensing receiver, a sounding PPDU that includes preamble training fields, and detecting, by a sensing initiator, environmental changes using managed sensing measurements obtained from the preamble training fields included in the sounding PPDU.

In an embodiment, the method includes indicating, by the sensing transmitter to the sensing receiver, to keep a parameter associated with the managed sensing measurements constant.

In an embodiment, the managed sensing measurements are CSI measurements, and where the CSI measurements are associated with a parameter that is made constant by the sensing transmitter.

A system for WLAN sensing is also disclosed. In an embodiment, the system includes a WLAN transmitter configured to transmit a sounding PPDU that includes preamble training fields, and a WLAN receiver configured to receive the sounding PPDU that includes the preamble training fields, and detect environmental changes using managed sensing measurements obtained from the preamble training fields.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 10 is a table for encoding of an up-link (UL) Target RSSI subfield.

FIG. 11 illustrates a flow diagram of a technique for WLAN sensing in accordance with an embodiment of the invention.

FIG. 12 depicts an example of a computer that can implement the technique for WLAN sensing as described with reference to FIG. 11.

Throughout the description, similar reference numbers may be used to identify similar elements.

DETAILED DESCRIPTION

Figure 1:
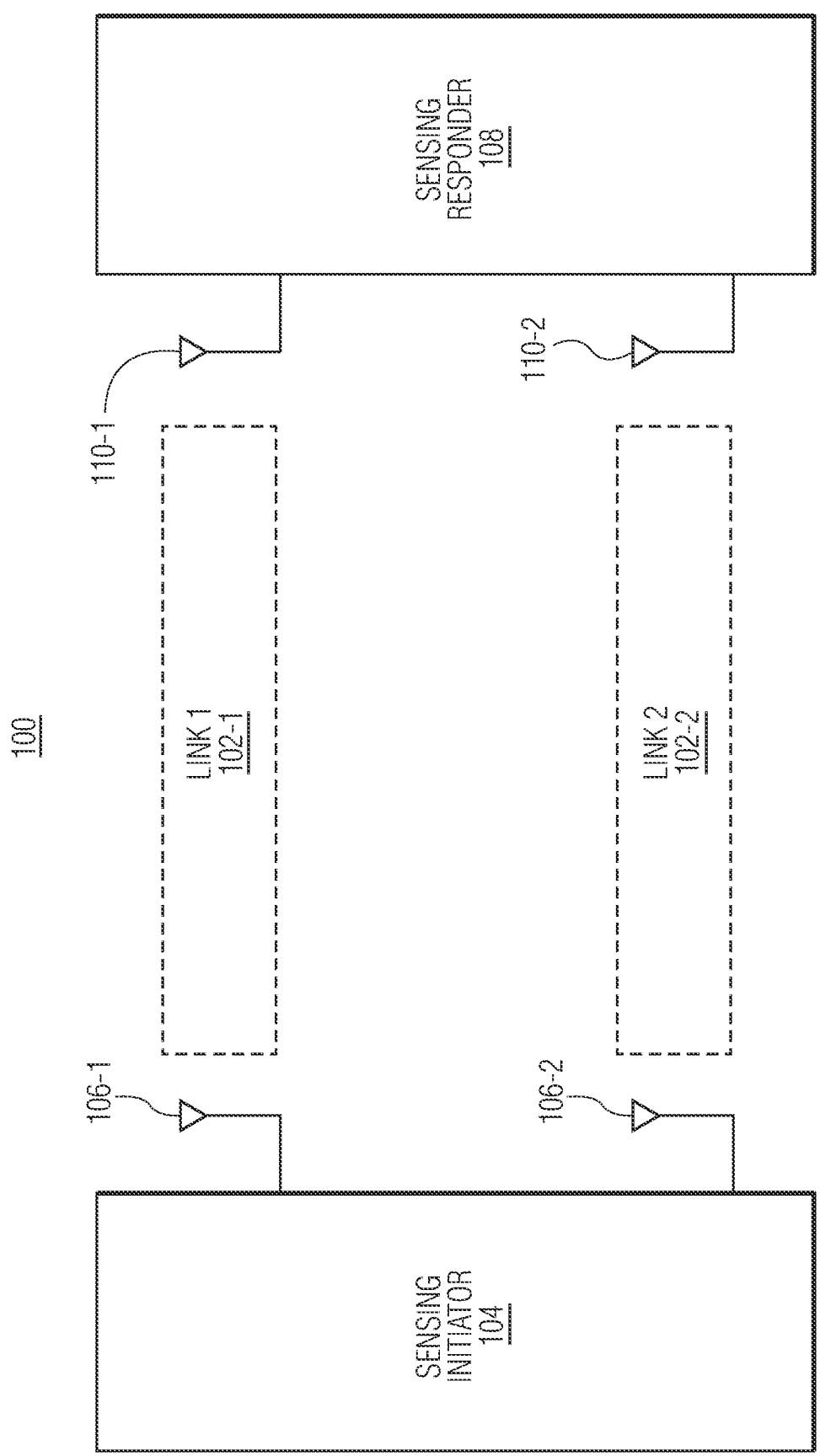
FIG. 1 depicts a wireless local area network (WLAN) sensing system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a wireless local area network (WLAN) system (e.g., a wireless sensing system), a device, e.g., a sensing initiator (e.g., a sensing transmitter or a sensing receiver) may exchange data with at least one associated sensing responder (e.g., a sensing receiver or a sensing transmitter). The sensing initiator may be configured to operate with associated sensing responders according to a communication protocol. For example, the communication protocol may be an Institute of Electrical and Electronics Engineers (IEEE) 802.11bf communication protocol. Features of WLAN sensing systems operating in accordance with the IEEE 802.11bf communication protocol and/or next-generation communication protocols may be referred to herein as "non-legacy" features. In some embodiments of the WLAN sensing system described herein, different associated sensing responders within range of a sensing initiator operating according to the IEEE 802.11bf communication protocol may be configured to operate according to at least one other communication protocol, but may be affiliated with lower data throughput protocols. The lower data throughput communication protocols (e.g., IEEE 802.11az communication protocol, IEEE 802.11 ax communication protocol, etc.) may be collectively referred to herein as "legacy" communication protocols.

FIG. 1 depicts a WLAN sensing system that is used for WLAN sensing. In the embodiment depicted in FIG. 1, the WLAN sensing system includes one sensing initiator, which is implemented as sensing initiator 104, and one sensing responder, which is implemented as sensing responder 108. The WLAN sensing system can be used in various applications, such as industrial applications, medical applications, computer applications, and/or consumer or enterprise applications. In some embodiments, the WLAN sensing system is a wireless sensing system, such as a wireless sensing system compatible with an IEEE 802.11 protocol. For example, the WLAN sensing system may be a wireless sensing system compatible with the IEEE 802.11bf protocol. Although the depicted WLAN sensing system 100 is shown in FIG. 1 with certain components and described with certain functionality herein, other embodiments of the WLAN sensing system may include fewer or more components to implement the same, less, or more functionality. For example, in some embodiments, the WLAN sensing system includes a single sensing initiator with multiple sensing responders, or multiple sensing initiators with multiple sensing responders. In another example, although the WLAN sensing system is shown in FIG. 1 as being connected in a certain topology, the network topology of the WLAN sensing system is not limited to the topology shown in FIG. 1.

In the embodiment depicted in FIG. 1, the sensing initiator 104 includes two antennas, implemented as initiator antenna-1 106-1 and initiator antenna-3 106-2. In an embodiment, the initiator antennas 106-1 and 106-2 may be transmit antennas, such that transmit antennas may transmit information to other devices. In another embodiment, the initiator antennas 106-1 and 106-2 may be receive antennas, such that receive antennas may receive information from other devices. The initiator antennas 106-1 and 106-2 may be implemented in hardware (e.g., circuits), software, firmware, or a combination thereof. The initiator antennas 106-1 and 106-2 may be fully or partially implemented as part of an integrated circuit (IC) device. In some embodiments, the initiator antennas 106-1 and 106-2 are implemented as part of wireless devices (e.g., wireless access points (APs)) compatible with at least one WLAN communications protocol (e.g., at least one IEEE 802.11 protocol). For example, the initiator antennas 106-1 and 106-2 may be part of wireless APs compatible with the IEEE 802.11bf protocol.

In some embodiments, the sensing initiator 104 connects to a local area network (e.g., a LAN) and/or to a backbone network (e.g., the Internet) through a wired connection and wirelessly connects to sensing responders (e.g., wireless stations (STAs)), for example, through one or more WLAN communications protocols, such as the IEEE 802.11 protocol. In some embodiments, the sensing initiator 104 is an access point (AP) multi-link device (MLD) that includes at least one AP with at least one antenna (e.g., initiator antenna-1 106-1 and/or initiator antenna-2 106-2), at least one transceiver operably connected to the at least one antenna, and at least one controller operably connected to the corresponding transceiver. In some embodiments, the at least one transceiver includes a Physical Layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. Although the sensing initiator 104 is shown in FIG. 1 as including two initiator antennas, other embodiments of the sensing initiator 104 may include more than two initiator antennas.

In the embodiment depicted in FIG. 1, the sensing responder, implemented as sensing responder 108, includes two antennas which are implemented as responder antenna-1 110-1 and responder antenna-2 110-2. In an embodiment, the responder antennas 110-1 and 110-2 may be transmit antennas, such that transmit antennas may transmit information to other devices. In another embodiment, the responder antennas 110-1 and 110-2 may be receive antennas, such that receive antennas may receive information from other devices. The responder antennas 110-1 and 110-2 may be implemented in hardware (e.g., circuits), software, firmware, or a combination thereof. The responder antennas 110-1 and 110-2 may be fully or partially implemented as part of an IC device. In some embodiments, the sensing responder 108 may be implemented as part of a wireless station (STA) device (e.g., non-AP STA MLD) that wirelessly connects to wireless APs. For example, the sensing responder 108 may be implemented in a laptop, a desktop personal computer (PC), a mobile phone, or other communications device that supports at least one WLAN communications protocol. In some embodiments, the sensing responder 108 may be a communications device compatible with at least one IEEE 802.11 protocol (e.g., the IEEE 802.11bf protocol).

In some embodiments, the responder antennas 110-1 and 110-2 may be part of wireless STAs compatible with the IEEE 802.11bf protocol. In some embodiments, a wireless STA may include at least one antenna (e.g., responder antenna-1 110-1 and/or responder antenna-2 110-2), at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver. Although the sensing responder 108 is shown in FIG. 1 as including two responder antennas, other embodiments of the sensing responder 108 may include one responder antenna or more than two responder antennas.

In the embodiment depicted in FIG. 1, the sensing responder 108 communicates with the sensing initiator 104 via two communication links, e.g., link1 102-1 and link2 102-2. For example, each of the responder antennas 110-1 or 110-2 communicates with initiator antennas 106-1 or 106-2 via corresponding communication links 102-1 or 102-2. In an embodiment, there may be four transmission paths (not shown), such that the four transmission paths may include transmissions from initiator antenna-1 106-1 to responder antenna-1 110-1, transmissions from initiator antenna-1 106-1 to responder antenna-2 110-2, transmissions from initiator antenna-2 106-2 to responder antenna-2 110-2, and/or transmissions from initiator antenna-2 106-2 to responder antenna-1 110-1. In such an embodiment, the four transmission paths may make up one communication link (not shown).

In an embodiment, a communication link (e.g., link1 102-1 or link2 102-2) may include a Basic Service Set (BSS) operating channel established by a sensing initiator (e.g., sensing initiator 104) that features multiple 20 MHz channels used to transmit packets (e.g., sounding packets, feedback packets, etc.) between a first wireless device (e.g., sensing initiator 104) and a second wireless device (e.g., sensing responder 108). As an example, a 20 MHz channel may include a number of spatial streams ($N_{SS}$) on which packets may be transmitted and/or received. In some embodiments, a 20 MHz channel may be a punctured 20 MHz channel or an unpunctured 20 MHz channel. In addition, although the sensing initiator 104 communicates (e.g., wirelessly communicates) with the sensing responder 108 via multiple links 102-1 and 102-2, in other embodiments, the sensing initiator 104 may communicate (e.g., wirelessly communicate) with the sensing responder 108 via one link or more than two communication links.

In some embodiments, WLAN sensing systems (e.g., WLAN sensing system 100) detect environmental changes and exploit systematic changes using wireless signal propagation(s) between devices (e.g., a sensing initiator and/or a sensing responder). Examples of environmental changes may include human presence detection, motion detection, activity recognition, gesture recognition, fall detection, human identification/authentication, radar applications that sense track movement in space/time, etc. Examples of systematic changes may include dynamic changes in transmitter/receiver configurations.

In an embodiment, channel state information (CSI) measurements, which represent how wireless signals propagate from a transmitter (e.g., a sensing initiator) to a receiver (e.g., sensing responder) at certain carrier frequencies along multiple paths, can be used to infer environmental changes. As an example, for a WLAN sensing system with Multiple- Input Multiple-Output (MIMO) orthogonal frequency-division multiplexing (OFDM), CSI measurements are a matrix of complex values representing an amplitude attenuation and a phase shift of multi-path wireless channels. In some embodiments, a time series of CSI measurements may capture how wireless signals travel through surrounding objects and humans in time, frequency, and spatial domains.

To measure a single snapshot of CSI measurements, a sensing transmitter may need to transmit a sounding Physical Layer (PHY) Protocol Data Unit (PPDU) to a sensing receiver. To obtain a time series of CSI measurements, the sensing transmitter may be required to transmit consecutive sounding PPDUs to the sensing receiver. However, systematic changes (e.g., dynamic changes in (sensing) transmitter configurations) can impact the reliability of the CSI measurements during WLAN sensing. For example, sensing transmitters may use beamforming which changes the amplitude and the phase of the CSI measurements. Consequently, CSI patterns may be completely changed, causing WLAN sensing to be more challenging as a beamforming matrix may not be available at the sensing receiver. In addition, it may become difficult for sensing devices to differentiate environmental changes from systematic changes.

In accordance with an embodiment of the invention, a device includes a wireless network interface device implemented on one or more ICs, wherein the wireless network interface device is configured to receive a sounding PPDU that includes preamble training fields, and detect environmental changes using managed sensing measurements obtained from the preamble training fields included in the sounding PPDU. By using managed sensing measurements, sensing devices (e.g., sensing initiators and/or sensing responders) are able to minimize changes in sensing transmitter configurations which reduces system variation in sensing measurement results. As such, WLAN sensing systems may be able to differentiate environmental changes from systematic changes more easily, and may experience an improvement in overall WLAN sensing quality.

As described herein, a WLAN sensing system may be defined as a wireless system capable of performing WLAN sensing, and that may include two or more devices, e.g., a sensing initiator and a sensing responder. The sensing initiator may be defined as the device that initiates WLAN sensing and/or that wants to possess sensing measurement results. As an example, a "sensing initiator" may be a sensing transmitter or a sensing receiver that is implemented as a device (e.g., an STA, an AP, a third party device, or the like). The sensing responder may be defined as the device that responds to the sensing initiator during WLAN sensing. As an example, a "sensing responder" may be a sensing transmitter or a sensing receiver that is implemented as a device (e.g., an STA, an AP, a third party device, or the like). Other devices may include WLAN transmitters and WLAN responders.

As described herein, a sounding PPDU may be defined as a PPDU, a packet, or a frame that includes training symbols, fields (e.g., preamble training fields), and/or subfields that are used for channel estimation, and that includes information related to WLAN sensing (e.g., managed sensing measurements). A sounding PPDU may be, for example, a Null Data PPDU (NDP) (up-link (UL) NDP or down-link (DL) NDP). Other frames described herein may include a Null Data Packet Announcement (NDPA) frame (UL NDPA frame or DL NDPA frame), a Sensing Measurement Report (SMR) frame, a Trigger Frame (TF) Sound frame, etc.

As described herein, managed sensing measurements may be defined as sensing-related measurements that have been influenced by a WLAN sensing system, a sensing initiator, and/or a sensing responder to incorporate a constant parameter or to modify a parameter. The managed sensing measurements may be obtained (e.g., determined) from preamble training fields included in a sounding PPDU. Examples of the managed sensing measurements include CSI measurements, power delay profiles, directional multi-gigabit (DMG) beamforming training measurements, and enhanced DMG (EDMG) beamforming training measurements. In addition, examples of the parameter associated with the managed sensing measurements include a transmit power parameter and a beamforming steering matrix.

In an embodiment, the managed sensing measurements are CSI measurements, such that the CSI measurements are associated with a parameter that is made constant by a sensing transmitter. In another embodiment, the managed sensing measurements are CSI measurements, such that the CSI measurements are associated with a parameter that cannot be made constant by the sensing transmitter. In such an embodiment, the sensing transmitter indicates its transmit power to the sensing receiver. In some embodiments, the CSI measurements are associated with a parameter that is managed and monitored by a sensing initiator or a sensing responder.

The managed sensing measurements may be used in WLAN sensing systems to detect environmental changes. As described herein, "detect" may imply identifying a change related to an environment around or near a WLAN sensing system. Examples of detected environmental change may include movement detection (e.g., intruder alert, presence detection for home automation, car notifications, etc.), movement classification (e.g., fall detection or gesture control), and/or radar applications that track movement in space and time.

In some embodiments, a WLAN sensing system may implement a constant parameter associated with managed sensing measurements when performing WLAN sensing. For example, a sensing transmitter may keep its transmit power constant during a WLAN sensing session. For sensing transmitters in WLAN sensing systems, Transmission Vector (TXVECTOR) represents a list of parameters that a MAC sublayer of the sensing transmitter may need to provide to a local PHY entity in order to transmit a MAC Protocol Data Unit (MPDU) to a sensing receiver. In an embodiment, the MAC sublayer uses the TXVECTOR to supply the PHY with per-PPDU transmit parameters to determine a structure of a PPDU. An example of a MAC sublayer providing a TXVECTOR to a PHY within a sensing transmitter that communicates with a sensing receiver is described in further detail with reference to FIG. 2.

Figure 2:
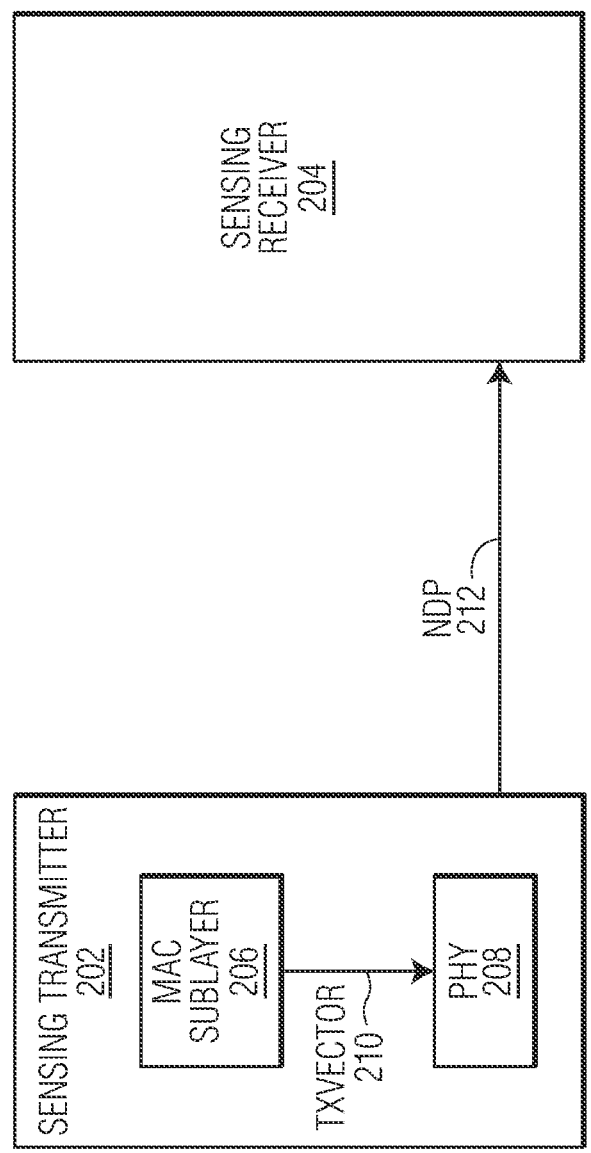
FIG. 2 illustrates an example of WLAN sensing system communications.

FIG. 2 illustrates an example of a sensing transmitter 202 communicating with a sensing receiver 204. In the embodiment of FIG. 2, the sensing transmitter 202 includes a MAC sublayer 206 and a PHY 208. The MAC sublayer 206 of the sensing transmitter 202 provides a TXVECTOR 210 to the PHY 208. The TXVECTOR 210 is then used by the PHY 208 to determine a structure and parameters of a PPDU (e.g., NDP). Using the structure and parameters derived from the TXVECTOR 210, the PHY 208 provides the sensing transmitter 202 with an NDP 212. The sensing transmitter 202 then transmits the NDP 212 to the sensing receiver 204.

One of the parameters of TXVECTOR (e.g., TXVECTOR 210) is Transmit Power Level Index (TXPWR_LEVEL_INDEX) (allowed values defined by IEEE 802.11 standard). The TXPWR_LEVEL_INDEX is used to indicate which of the available transmit output power levels shall be used for a current transmission, where mapping between a TXPWR_LEVEL_INDEX value and an actual transmit power is implementation specific. In an embodiment, to maintain a constant parameter in managed sensing measurements, a sensing transmitter (e.g., sensing transmitter 202) may not change the TXPWR_LEVEL_INDEX parameter of the TXVECTOR 210.

As an example, a WLAN station serving as a sensing initiator that initiates WLAN sensing and performs sensing measurements may transmit a trigger frame to one or more STAs which serve as sensing responders. In such an example, a MAC of each sensing responder may keep a TXPWR_LEVEL_INDEX value constant when transmitting consecutive sounding PPDUs to the sensing initiator.

As another example, a WLAN station may serve as a sensing initiator that initiates WLAN sensing, and another WLAN station may server as a sensing responder. In such an example, the sensing initiator first transmits an NDPA frame to the sensing responder, then transmits NDPs to the sensing responder. When transmitting the NDPs, a MAC of the sensing initiator keeps the TXPWR_LEVEL_INDEX value constant. After completing sensing measurements (e.g., CSI measurements), the sensing responder reports sensing measurement results to the sensing initiator.

In some embodiments, a beamforming steering matrix is kept constant in addition to a constant transmit power parameter. For example, if transmit beamforming is used, then the beamforming steering matrix at a sensing transmitter shall be kept constant when transmitting consecutive sounding PPDUs to the sensing receiver. In some embodiments, parameters of other sensing measurements may also be kept constant. For example, parameters of power delay profiles, DMG beamforming training measurements, and EDMG beamforming training measurements may be kept constant.

According to conventional sensing applications and conventional radar applications, an environment is measured or "sensed" by receiving a known waveform and calculating a channel effect (e.g., multi-path propagation and attenuation). As an example, in bi-static radar/sensing (where a transmitter and a receiver are separate devices), a line-of-sight transmission is received as a reference and other radio frequency (RF) propagation paths are measured and separated into "targets" (moving) and "clutter" (motionless). Due to a large power imbalance (near/far effect) of clutter vs. targets, small (and uncompensated) variations in a transmit waveform can introduce significant artifacts (e.g., targets submerged or concealed in clutters). Additionally, some RF components may introduce various filter and/or non-linear effects when Transmit (Tx) Power is changed, which may cause a receiver to detect a change and/or artifacts in its processing. As such, by keeping a transmit power constant and/or announcing/reporting changes in the transmit power or transmit power levels, variations in transmit waveforms and introduced artifacts can be minimized.

In conventional non-Trigger Based (non-TB) sensing, the IEEE 802.11bf communication protocol suggests using all or part of a non-TB sensing sequence. In an embodiment, one STA is a sensing initiator, and one AP-STA is a sensing responder. A Responder-to-Initiator (R2I) NDP allows the sensing initiator to measure/sense a channel and an Initiator-to-Responder (I2R) NDP allows the sensing responder to measure/sense the channel. To allow the sensing initiator to keep a transmit power constant and/or announce/report changes in the transmit power or transmit power levels, the sensing initiator may need to announce a transmit power level of an I2R NDP or ask the sensing responder to keep an R2I NDP Tx Power constant. To allow the sensing responder to keep the transmit power constant and/or announce/report changes in the transmit power or transmit power levels, the sensing responder may need to announce a transmit power level of an R2I NDP or ask the sensing initiator to keep an I2R NDP Tx Power constant. An example of a sensing initiator and a sensing responder performing non-TB sensing is described in further detail with reference to FIG. 3.

Figure 3:
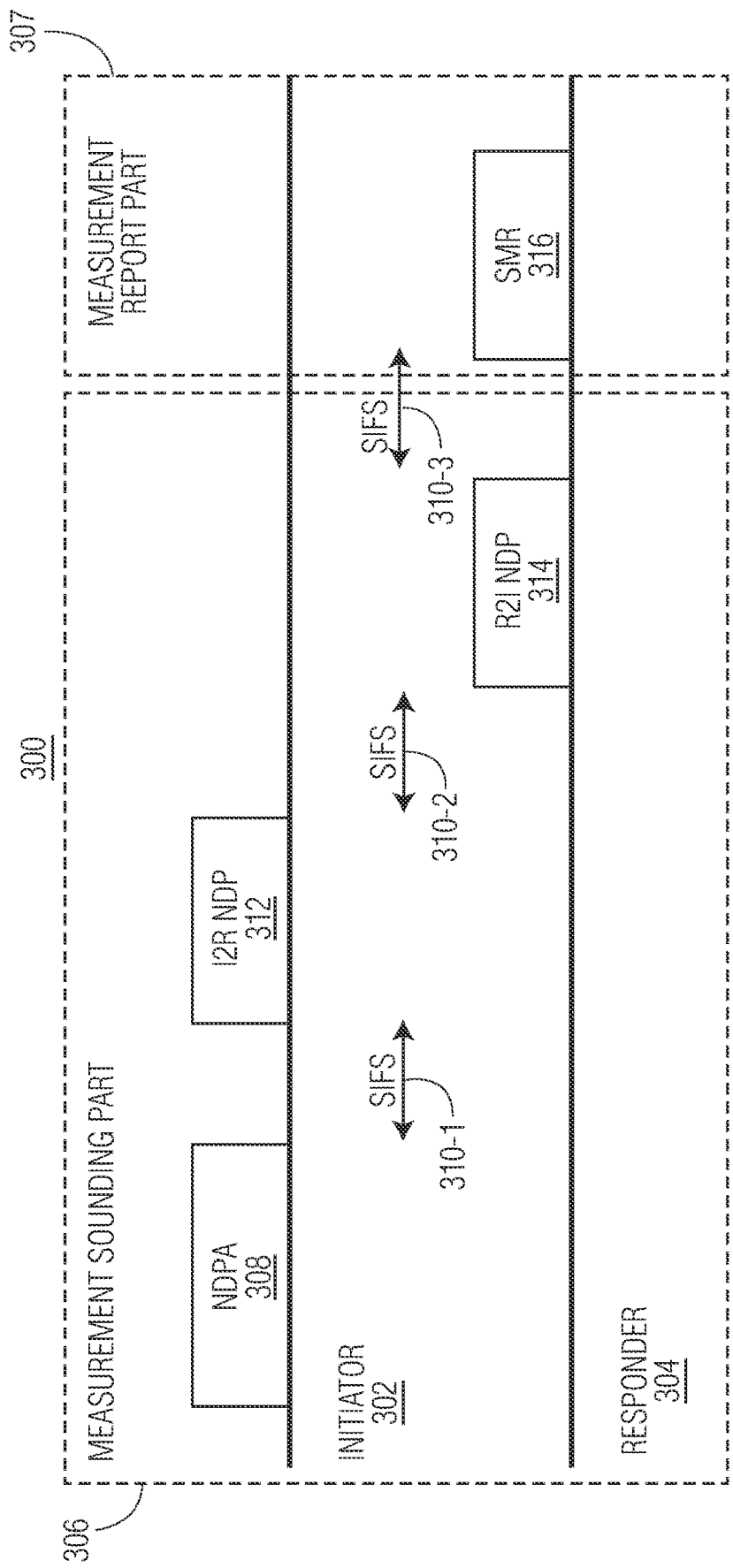
FIG. 3 illustrates an example of non-Trigger Based (non-TB) sensing.

FIG. 3 illustrates an example of non-TB sensing 300. In the non-TB sensing 300, a sensing initiator and a sensing responder, implemented as an initiator 302 and a responder 304, respectively, communicate in a measurement sounding part 306 (outlined by dashed lines) and a measurement report part 308 (outlined by dashed lines). During the measurement sounding part 306, the initiator 302 transmits an NDPA frame 308 to the responder 304. After a first Short Interframe Space (SIFS) 310-1, the initiator 302 transmits an I2R NDP 312 to the responder 304. After a second SIFS 310-2, the responder 304 transmits an R2I NDP 314 to the initiator 302. During a third SIFS 310-3, the measurement sounding part 306 ends and the measurement report part 308 begins. During the measurement report part 308, the responder 304 transmits an SMR frame 316 to the initiator 302.

To keep a transmit power constant during the non-TB sensing 300, the NDPA frame 308 or the SMR frame 316 may indicate to keep the transmit power constant. An example of the NDPA frame and its subfields is described in further detail with reference to FIG. 4 and FIG. 5, respectively, and an example of the SMR frame is described in further detail with reference to FIG. 6.

Figure 4:
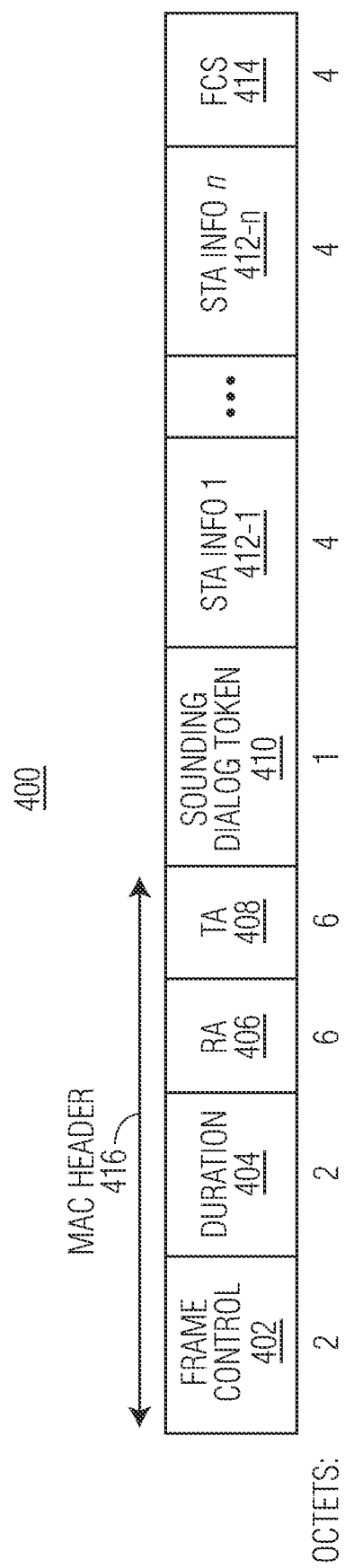
FIG. 4 depicts an example of a Null Data Packet Announcement (NDPA) frame.

FIG. 4 depicts an example of an NDPA frame 400. The NDPA frame 400 represents an embodiment of the NDPA frame 308 (FIG. 3). In particular, the NDPA frame 400 shown in FIG. 4 includes at least seven fields, implemented as a Frame Control field 402 (2 octets), a Duration field 404 (2 octets), a Receiving Address (RA) field 406 (6 octets), a Transmission Address (TA) field 408 (6 octets), a Sounding Dialog Token field 410 (1 octet), a first STA Info field (shown as "STA Info 1") 412-1 (4 octets), a subsequent STA Info field (shown as "STA Info n", where n represents an integer greater than one) 412-n (4 octets), and a Frame Check Sequence (FCS) field 414 (4 octets). In an embodiment, a MAC header portion 416 includes the Frame Control field 402, the Duration field 404, the RA field 406, and the TA field 408.

Figure 5:
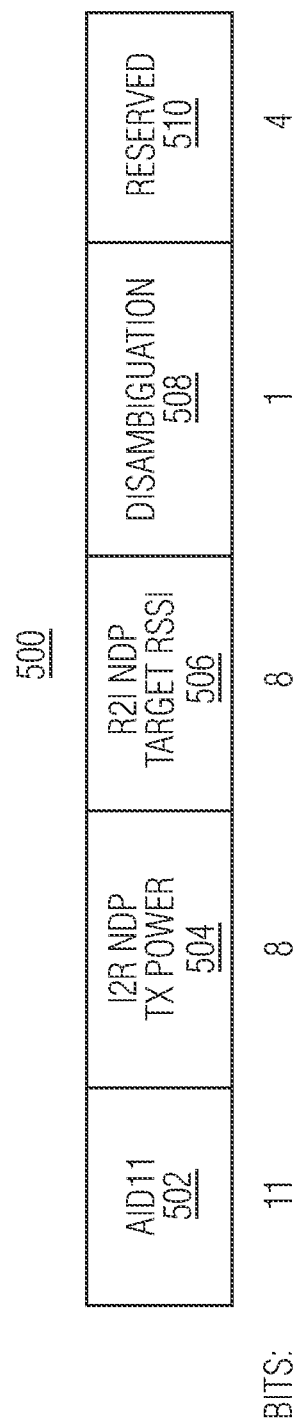
FIG. 5 depicts an example of a station (STA) Info field.

FIG. 5 depicts an example of an STA Info field 500. In some embodiments, the STA Info field 500 may represent a per-STA Info field and is an embodiment of the first STA Info field 412-1 and/or the subsequent STA Info field 412-n (FIG. 4). In the embodiment of FIG. 5, the STA Info field 500 includes five subfields, implemented as an Association Identifier (AID) 11 (AID11) subfield 502 (11 bits), an I2R NDP Tx Power subfield 504 (8 bits), an R2I NDP Target Received Signal Strength Indicator (RSSI) subfield 506 (8 bits), a Disambiguation subfield 508 (1 bit), and a Reserved subfield 510 (4 bits).

With reference to FIG. 4 and FIG. 5, the STA Info field 500 of the NDPA frame 400 with the AID11 subfield 502 (equal to 2045) may be used in a non-TB sensing measurement exchange (e.g., non-TB sensing 300 (FIG. 3)), to carry the I2R NDP Tx Power subfield 504 and the R2I NDP Target RSSI 506 subfield (see 11.21.6.4.4 non-TB ranging measurement exchange).

In some embodiments, the I2R NDP Tx Power subfield 504 indicates a combined average power per-20 MHz bandwidth referenced to an antenna connector, of all antennas used to transmit a following I2R NDP (e.g., I2R NDP 312 (FIG. 3)). In such an embodiment, the transmit power is reported with a resolution of 1 decibel (dB), with values in a range of 0 to 60 representing −20 decibel-milliwatts (dBm) to 40 dBm, respectively, where values above 60 are reserved.

In some embodiments, the R2I NDP Target RSSI subfield 506 indicates a preferred receive signal power, averaged over a sensing initiator's antenna connectors, for future R2I NDPs to be transmitted by the sensing responder. In such an embodiment, a preferred receive signal power in units of dBm is Target RSSI=−110+FVal, where FVal is a value of the R2I NDP Target RSSI subfield, except that values above 90 indicate that the sensing initiator does not have a receive signal power preference for the R2I NDPs.

As such, the I2R NDP Tx Power subfield 504 and the R2I NDP Target RSSI subfield 506 allow the sensing initiator to announce a transmit power level of an I2R NDP. Additionally, specifying a Target RSSI does not allow a request for constant transmit power of the R2I NDP, so the transmit power of the R2I NDP will depend on a measured pathloss at the sensing responder, as the transmit power will be chose to compensate for the measured pathloss.

In some embodiments, an NDPA frame (e.g., NDPA frame 400) indicates to keep the transmit power of the sensing responder constant via an added field bit, a reserved value included in the R2I NDP Target RSSI subfield 506, and/or a specific bit included in the R2I NDP Target RSSI subfield 506. As an example, the NDPA frame 400 indicates to keep the transmit power of the sensing responder constant via a reserved value of "0xff" included in the R2I NDP Target RSSI subfield 506. As another example, the NDPA frame 400 indicates to keep the transmit power of the sensing responder constant via a Most Significant Bit (MSB) or a Least Significant Bit (LSB) included in the R2I NDP Target RSSI subfield 506.

Figure 6:
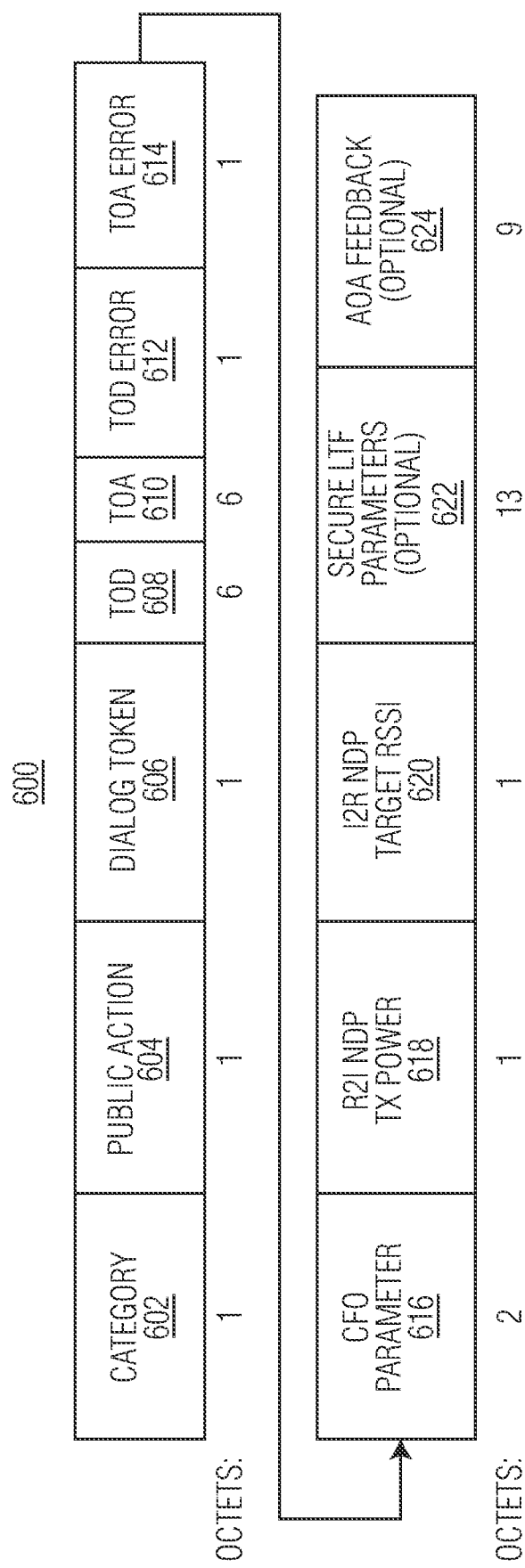
FIG. 6 depicts an example of a Sensing Measurement Report (SMR) frame.

FIG. 6 depicts an example of an SMR frame 600. The SMR frame 600 represents an embodiment of the SMR frame 316 (FIG. 3). In particular, the SMR frame 600 shown in FIG. 6 includes 12 fields, implemented as a Category field 602 (1 octet), a Public Action field 604 (1 octet), a Dialog Token field 606 (1 octet), a Time-of-Departure (TOD) field 608 (6 octets), a Time-of-Arrival (TOA) field 610 (6 octets), a TOD Error field 612 (1 octet), a TOA Error field 614 (1 octet), a Carrier Frequency Offset (CFO) Parameter field 616 (2 octets), an R2I NDP Tx Power field 618 (1 octet), an I2R NDP Target RSSI field 620 (1 octet), a Secure Long Training Field (LTF) Parameters (optional) field 622 (13 octets), and an Angle-of-Arrival (AOA) Feedback (optional) field 624 (9 octets).

When negotiated, the R2I NDP Tx Power field 618 and the I2R NDP Target RSSI field 620 are used in an R2I SMR frame (an SMR frame transmitted by a sensing responder to a sensing initiator) as part of a non-TB ranging measurement exchange (e.g., non-TB sensing 300 (FIG. 3)), otherwise their values are reserved (see 11.21.6.4.4 non-TB ranging measurement exchange).

In some embodiments, the R2I NDP Tx Power field 618 indicates a combined average power per-20 MHz bandwidth referenced to an antenna connector, of all antennas used to transmit a preceding R2I NDP (e.g., R2I NDP 314 (FIG. 3)). In such an embodiment, the transmit power is reported with a resolution of 1 dB, with values in a range of 0 to 60 representing −20 dBm to 40 dBm, respectively, where values above 60 are reserved.

In some embodiments, the I2R NDP Target RSSI field 620 indicates a preferred receive signal power, averaged over a sensing responder's antenna connectors, for future I2R NDPs to be transmitted by the sensing initiator. In such an embodiment, a preferred receive signal power in units of dBm is Target RSSI=−110+FVal, where FVal is a value of a Target RSSI field, except that values above 90 indicate that the sensing responder does not have a receive signal power preference for the I2R NDPs.

As such, the R2I NDP Tx Power field 618 and the I2R NDP Target RSSI field 620 allow the sensing responder to announce a transmit power level of an R2I NDP. Additionally, specifying a Target RSSI does not allow a request for constant transmit power of an I2R NDP, so the transmit power of the I2R NDP will depend on a measured pathloss at the sensing responder, as the transmit power will be chose to compensate for the measured pathloss.

In some embodiments, an SMR frame (e.g., SMR frame 600) indicates to keep the transmit power of the sensing initiator constant via an added field bit, a reserved value included in the I2R NDP Target RSSI field 620, and/or a specific bit included in the I2R NDP Target RSSI field 620. As an example, the SMR frame 600 indicates to keep the transmit power of the sensing initiator constant via a reserved value of "0xff" included in the I2R NDP Target RSSI field 620. As another example, the SMR frame 600 indicates to keep the transmit power of the sensing initiator constant via an MSB or a LSB included in the I2R NDP Target RSSI field 620.

Examples of NDP Target RSSI subfields that may be included in the STA Info field 500 (FIG. 5) and/or the SMR frame 600 (FIG. 6) are described in further detail with reference to FIGS. 7A-7B.

Figure 7:
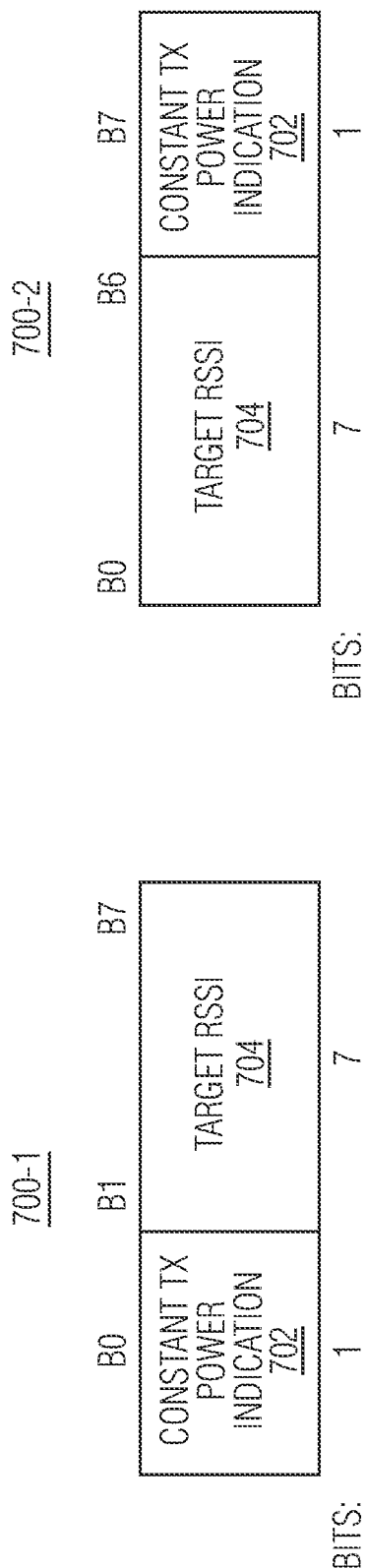
FIG. 7A depicts an example of a Null Data Physical Layer (PHY) Protocol Data Unit (PPDU) (NDP) Target Received Signal Strength Indicator (RSSI) subfield.
FIG. 7B depicts another example of an NDP Target RSSI subfield.

FIG. 7A depicts an example of an NDP Target RSSI subfield 700-1. The NDP Target RSSI subfield 700-1 represents an embodiment of R2I NDP Target RSSI subfield 506 (FIG. 5) and/or I2R NDP Target RSSI field 620 (FIG. 6). In particular, the NDP Target RSSI subfield includes two subfields, implemented as a Constant Tx Power Indication subfield 702 (1 bit; B0) and a Target RSSI subfield 704 (7 bits; B1 to B7).

FIG. 7B depicts another example of an NDP Target RSSI subfield 700-2. The NDP Target RSSI subfield 700-2 includes the Constant Tx Power Indication subfield 702 and the Target RSSI subfield 704 as described with reference to FIG. 7A. In contrast to FIG. 7A, the Target RSSI subfield 704 is B0 to B6 and the Constant Tx Power Indication subfield 702 is B7.

In conventional Trigger-Based (TB) sensing, the IEEE 802.11bf communication protocol suggests using all or part of a TB sensing sequence. In an embodiment, if an STA is an intended receiver (e.g., sensing receiver), then a DL NDP lets the STA measure/sense a channel. In another embodiment, if an AP-STA is the intended receiver, then UL NDP(s) let the AP measure/sense the channel. To support the STA and keep the transmit power constant and/or to announce/report changes in the transmit power or transmit power levels, a transmit power of the UL NDP(s) may need to be kept constant (e.g., on/off so an update can occur in between the UL NDP(s)). To support the AP and keep the transmit power constant and/or to announce/report changes in the transmit power or transmit power levels, a transmit power level of the DL NDP may need to be announced. An example of an AP and STAs performing TB sensing is described in further detail with reference to FIG. 8.

Figure 8:
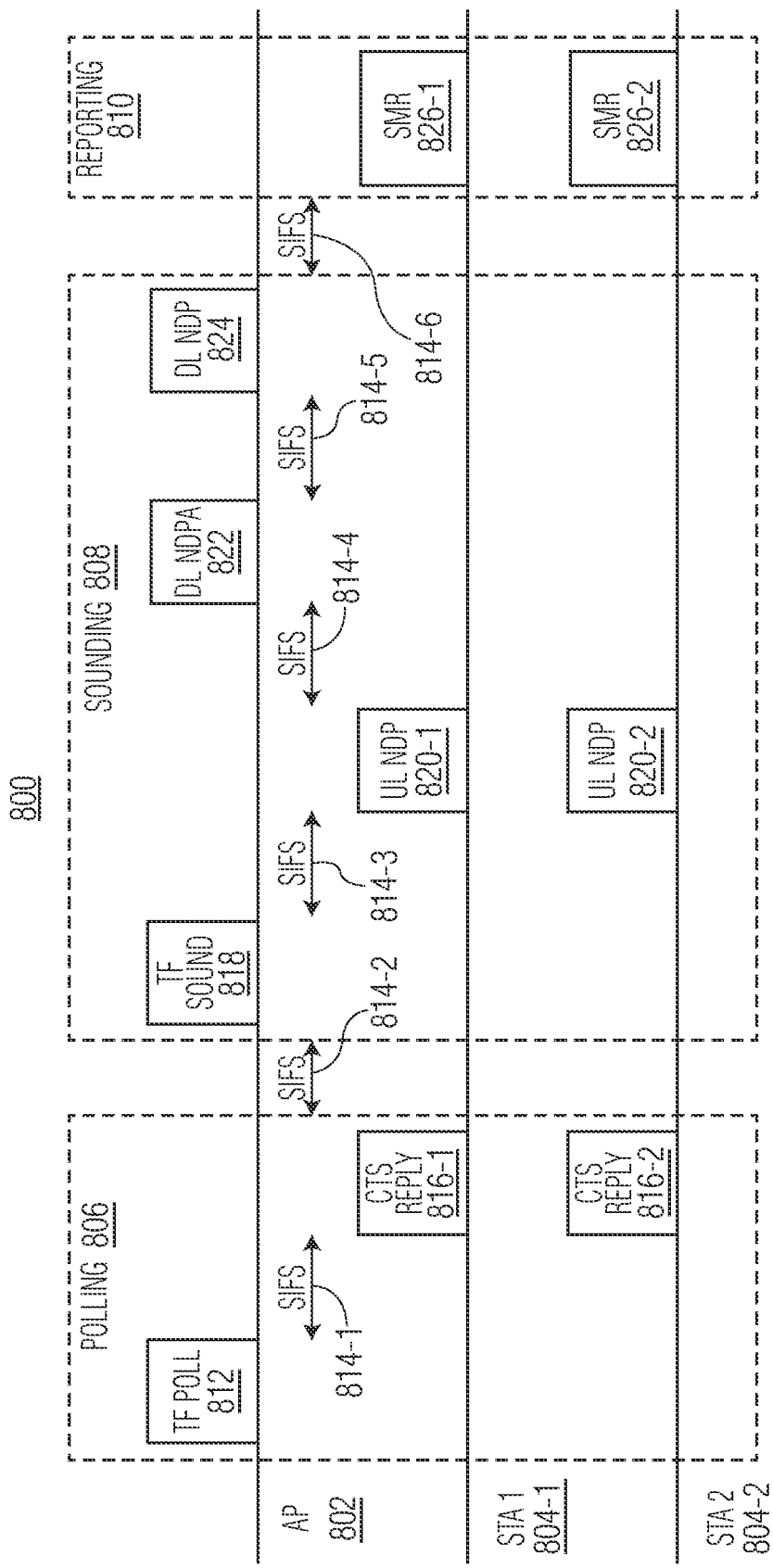
FIG. 8 illustrates an example of Trigger-Based (TB) sensing.

FIG. 8 illustrates an example of TB sensing 800. In the TB sensing 800, an AP, implemented as AP 802, and two STAs, implemented as STA1 804-1 and STA2 804-2, communicate in a polling part 806 (outlined by dashed lines), a sounding part 808 (outlined by dashed lines), and a measurement report part 810 (outlined by dashed lines).

During the polling part 806, AP 802 transmits a TF Poll frame 812 to STAs 804-1 and 804-2. After a first SIFS 814-1, STA1 804-1 transmits a first Clear-to-Send (CTS) Reply frame 816-1 to AP 802 and STA2 804-2 transmits a second CTS Reply frame 816-2 to AP 802. The polling part 806 ends after AP 802 receives the first CTS Reply frame 816-1 and the second CTS Reply frame 816-2.

After a second SIFS 814-2, the sounding part 808 begins. During the sounding part 808, AP 802 transmits a TF Sound frame 818 to STAs 804-1 and 804-2. After a third SIFS 814-3, STA1 804-1 transmits a first UL NDP 820-1 to AP 802 and STA2 804-2 transmits a second UL NDP 820-2 to AP 802. After a fourth SIFS 814-4, AP 802 transmits a DL NDPA frame 822 to STAs 804-1 and 804-2, and after a fifth SIFS 814-5, AP 802 transmits a DL NDP 824 to STAs 804-1 and 804-2. The sounding part 808 ends after AP 802 transmits the DL NDP 824.

After a sixth SIFS 814-6, the reporting part 810 begins. During the reporting part 810, STA1 804-1 transmits a first SMR frame 826-1 to AP 802 and STA2 804-2 transmits a second SMR frame 826-2 to AP 802.

In an embodiment, to keep a transmit power constant in a TB sensing measurement exchange (e.g., TB sensing 800), an additional signaling field is included in an NDPA frame (e.g., DL NDPA frame 822) to indicate to keep the transmit power of a DL NDP constant. In another embodiment, to keep a transmit power constant in a TB sensing measurement exchange (e.g., TB sensing 800), an additional signaling field is included in a trigger frame (e.g., TF Sound frame 818), to indicate to keep the transmit power of a UL NDP constant and in an SMR frame (e.g., SMR frames 826-1 and 826-2) to indicate a transmit power of a UL NDP.

In some embodiments, an NDPA frame is transmitted in a TB sensing measurement exchange, where the NDPA frame indicates a transmit power of a DL NDP frame. As an example, a STA Info field with an AID of 2045 included in an NDPA frame (e.g., DL NDPA frame 822) that is transmitted during TB sensing contains an I2R NDP Tx Power subfield to indicate a transmit power of a DL NDP (e.g., DL NDP 824).

In some embodiments, a Trigger frame is transmitted in a TB sensing measurement exchange, where the Trigger frame indicates to keep a transmit power of a UL NDP frame constant. As an example, the Trigger frame sounding indicates to keep the transmit power of the UL NDP frame constant via a modified TF Sound frame (e.g., TF Sound frame 818), and/or indicates a transmit power of the UL NDP via a signal included in an SMR frame (e.g., SMR frames 826-1 and 826-2). In such an example, the modified TF Sound frame sound uses a reserved bit included in a User Info field, or a redefined UL Target Receive Power subfield to indicate to keep the transmit power of the UL NDP frame constant. An example of a User Info field and a table for encoding a UL Target RSSI subfield is described in further detail with reference to FIG. 9 and FIG. 10, respectively.

Figure 9:
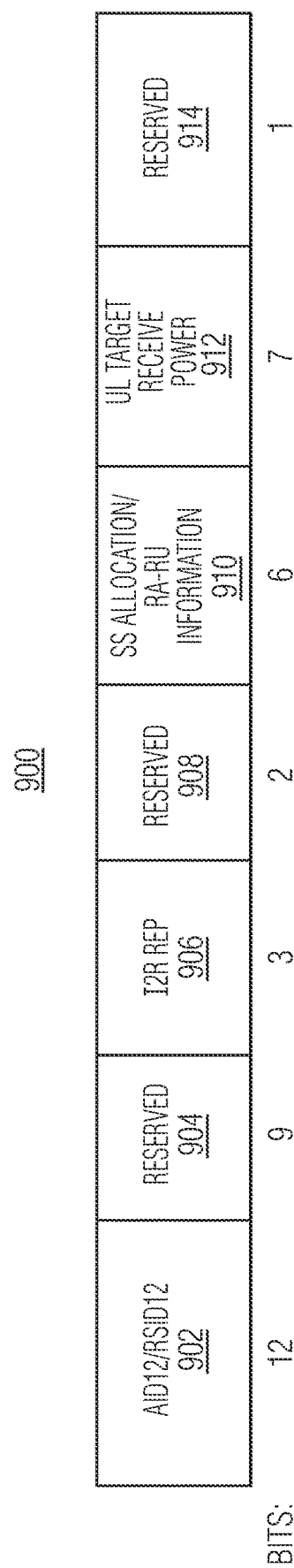
FIG. 9 depicts an example of a User Info field.

FIG. 9 depicts an example of a User Info field 900. The User Info field 900 may be included in the TF Sound frame 818 (FIG. 8). In particular, the User Info field 900 shown in FIG. 9 includes seven fields, implemented as AID 12 or Ranging Session Identifier (RSID) 12 subfield (shown as "AID12/RSID12") 902 (12 bits), a first Reserved subfield 904 (9 bits), an I2R Rep subfield 906 (3 bits), a second Reserved subfield 908 (2 bits), a Spatial Stream (SS) Allocation or Resource Unit (RU) Allocation (RA)-RU Information subfield (shown as "SS Allocation/RA-RU Information") 910 (6 bits), a UL Target Receive Power subfield 912 (7 bits), and a third Reserved subfield 914 (1 bit). In an embodiment, a reserved bit included in a Reserved subfield (e.g., the first Reserved subfield 904, the second Reserved subfield 908, or the third Reserved subfield 914) may be used to indicate a constant transmit power.

FIG. 10 is a table for encoding of a UL Target RSSI subfield 1000. The table 1000 includes two columns, implemented as a first column "UL Target Receive Power subfield" and a second column "Description". The UL Target Receive Power subfield defines bit ranges, and the description defines a corresponding implementation of the bit ranges. In an embodiment, the UL Target Receive Power subfield may be redefined to indicate a constant transmit power. For example, the reserved values that correspond to the bit range of 91-126 may be redefined to indicate the constant transmit power.

In some embodiments, an IEEE 802.11az communication protocol (802.11az) uses (modified) frames defined by an IEEE 802.11ax communication protocol (802.11ax). In some embodiments, an IEEE 802.11be communication protocol (802.11be) may use a new NDP-Announcement subvariant or a new NDP based on a PHY defined by 802.11be (e.g., mostly a new SIG-A field and support for 320 MHz bandwidth). In an embodiment, an IEEE 802.11bf communication protocol (802.11bf) may not support formats defined by 802.11be. In such an embodiment, 802.11bf may use sequences defined by the IEEE 802.11az with (optional) new NDP formats and/or NDPA formats. In another embodiment, 802.11bf may trim protocols defined by 802.11az. For example, 802.11bf may omit UL NDPs or DL NDPs, or remove TF Poll frames for associated STAs (or all). In some embodiments, new formats may be transferred, such that transmit power control may only be needed in one direction (e.g., at a time—depending on use case).

FIG. 11 illustrates a flow diagram of a technique for WLAN sensing in accordance with an embodiment of the invention. At block 1102, a device receives a sounding PPDU that includes preamble training fields. At block 1104, the device detects environmental changes using managed sensing measurements obtained from the preamble training fields included in the sounding PPDU.

In some embodiments, the technique for WLAN sensing includes receiving, by a sensing transmitter from a sensing receiver, a sounding PPDU that includes preamble training fields, and detecting, by a sensing initiator, environmental changes using managed sensing measurements obtained from the preamble training fields included in the sounding PPDU.

In some embodiments, the technique for WLAN sensing may be implemented by a system. For example, a system includes a WLAN transmitter configured to transmit a sounding PPDU that includes preamble training fields. In such an example, the system also includes a WLAN receiver configured to receive the sounding PPDU that includes the preamble training fields, and detect environmental changes using managed sensing measurements obtained from the preamble training fields.

In an embodiment, the above-described functionality is performed at least in part by a computer or computers, which executes computer readable instructions. FIG. 12 depicts an example of a computer 1200 that can implement the technique for WLAN sensing as described herein with reference to FIG. 11. As shown, the computer 1200 includes a processor 1202, a memory 1204, and a communications interface 1206. The processor may include a multifunction processor and/or an application-specific processor. As an example, the processor could be a CPU (with software), an application-specific integrated circuit (ASIC), a transceiver, a radio, or a combination thereof. The memory within the computer may include, for example, storage medium such as read only memory (ROM), flash memory, random-access memory (RAM), and a large capacity permanent storage device such as a hard disk drive. The communications interface enables communications with other computers via, for example, the Internet Protocol (IP). The computer executes computer readable instructions stored in the storage medium to implement various tasks as described above.

As an example, the computer 1200 may represent a sensing device (e.g., a sensing initiator, a sensing responder, a sensing transmitter, a sensing receiver, a WLAN transmitter, a WLAN receiver, etc.). In such an example, the sensing device includes a wireless network interface device implemented on one or more ICs. As an example, the wireless network interface device may include or connect to antennas, processors, batteries, storage mediums, etc., and may be configured to perform wireless operations and/or communications.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc. Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A device comprising:
    a wireless network interface device implemented on one or more integrated circuits (ICs),
    wherein the wireless network interface device is configured to:
        receive or transmit a sounding Physical Layer (PHY) Protocol Data Unit (PPDU) that includes preamble training fields; and
        detect environmental changes using managed sensing measurements obtained from the preamble training fields included in the sounding PPDU;
    wherein the device transmits at least one frame in a sensing measurement exchange indicating to keep a transmit power constant;
    wherein the device transmits at least one of a Null Data Packet Announcement (NDPA) frame and a Sensing Measurement Report (SMR) frame in a non-Trigger Based (non-TB) sensing measurement exchange;
    wherein at least one of the NDPA frame and the SMR frame indicates at least one of to keep a transmit power constant and a transmit power of a Null Data PPDU (NDP); and
    wherein at least one of the NDPA frame and the SMR frame indicates to keep the transmit power constant via at least one of: an added field bit; a reserved value included in an NDP Target Received Signal Strength Indicator (RSSI) subfield; and a bit included in the NDP Target RSSI subfield.

2. The device of claim 1, wherein the managed sensing measurements are channel state information (CSI) measurements, and wherein the CSI measurements are associated with a parameter that is managed and monitored by at least one of a sensing initiator and a sensing responder.

3. The device of claim 2, wherein the parameter is at least one of a transmit power parameter and a beamforming steering matrix.

4. The device of claim 1, wherein:
    the managed sensing measurements are CSI measurements; and
    the CSI measurements are associated with a parameter that is made constant by at least one of a sensing initiator and a sensing responder.

5. The device of claim 1, wherein:
    the managed sensing measurements are CSI measurements;
    the CSI measurements are associated with a parameter that cannot be made constant by a sensing transmitter; and
    the sensing transmitter indicates its transmit power to a sensing receiver.

6. The device of claim 1, wherein at least one of the NDPA frame and the SMR frame indicates to keep the transmit power constant via a reserved value of "0xff" included in an NDP Target RSSI subfield.

7. The device of claim 1, wherein at least one of the NDPA frame and the SMR frame indicates to keep the transmit power constant via at least one of a Most Significant Bit (MSB) and a Least Significant Bit (LSB) included in an NDP Target RSSI subfield.

8. The device of claim 1, wherein the device transmits an NDPA frame in a Trigger-Based (TB) sensing measurement exchange, and wherein the NDPA frame indicates to keep a transmit power of a down-link (DL) NDP frame constant.

9. The device of claim 1, wherein:
    a modified Trigger Frame (TF) Sound frame indicates to keep a transmit power of an up-link (UL) NDP frame constant; and
    an SMR frame indicates the transmit power of the UL NDP frame.

10. The device of claim 9, wherein the modified TF Sound frame uses at least one of a redefined UL Target Receive Power subfield and a reserved bit included in a User Info field to indicate to keep the transmit power of the UL NDP frame constant.

11. The device of claim 1, wherein the device transmits an NDPA frame in a TB sensing measurement exchange, and wherein the NDPA frame indicates a transmit power of a DL NDP frame.

12. The device of claim 11, wherein the NDPA frame indicates the transmit power of the DL NDP frame via a Station (STA) Info field with an Association Identifier (AID) of 2045.

13. The device of claim 1, wherein the environmental changes are detected by using the managed sensing measurements to differentiate the environmental changes from system configuration changes.

14. The device of claim 1, wherein the managed sensing measurements are at least one of CSI measurements, power delay profiles, directional multi-gigabit (DMG) beamforming training measurements, and enhanced DMG (EDMG) beamforming training measurements.

15. The device of claim 1:
wherein the device is configured to keep the transmit power constant during a process of transmitting a set of consecutive sounding PPDUs.

16. A device comprising:
a wireless network interface device implemented on one or more integrated circuits (ICs),
wherein the wireless network interface device is configured to:
receive or transmit a sounding Physical Layer (PHY) Protocol Data Unit (PPDU) that includes preamble training fields; and
detect environmental changes using managed sensing measurements obtained from the preamble training fields included in the sounding PPDU;
wherein the device transmits at least one frame in a sensing measurement exchange indicating to keep a transmit power constant;
wherein the device transmits an NDPA frame in a Trigger-Based (TB) sensing measurement exchange, and
wherein the NDPA frame indicates to keep a transmit power of a down-link (DL) NDP frame constant.

17. A device comprising:
a wireless network interface device implemented on one or more integrated circuits (ICs),
wherein the wireless network interface device is configured to:
receive or transmit a sounding Physical Layer (PHY) Protocol Data Unit (PPDU) that includes preamble training fields; and
detect environmental changes using managed sensing measurements obtained from the preamble training fields included in the sounding PPDU;
wherein the device transmits at least one frame in a sensing measurement exchange indicating to keep a transmit power constant;
wherein a modified Trigger Frame (TF) Sound frame indicates to keep a transmit power of an up-link (UL) NDP frame constant; and
wherein an SMR frame indicates the transmit power of the UL NDP frame.

* * * * *